United States Patent
Yoshida et al.

(10) Patent No.: US 7,106,534 B2
(45) Date of Patent: Sep. 12, 2006

(54) METHOD FOR COMPENSATING TIMING TO START DATA RECORDING AND MAGNETIC DISK DEVICE USING SAME

(75) Inventors: Hitoshi Yoshida, Fujisawa (JP); Yasuyuki Ito, Fujisawa (JP); Kiyotada Itou, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 0 days.

(21) Appl. No.: 10/677,071

(22) Filed: Sep. 30, 2003

(65) Prior Publication Data

US 2004/0190174 A1    Sep. 30, 2004

(30) Foreign Application Priority Data

Mar. 26, 2003    (JP)    ............................. 2003-085870

(51) Int. Cl.
  *G11B 5/09*    (2006.01)
  *G11B 15/12*   (2006.01)
(52) U.S. Cl. .......................................... 360/51; 360/62
(58) Field of Classification Search ............ 360/51–52, 360/61–62, 50, 55, 64, 71, 72.1, 39, 77.04, 360/77.05, 77.06, 77.08, 78.04
  See application file for complete search history.

(56) References Cited

U.S. PATENT DOCUMENTS

| | | | | |
|---|---|---|---|---|
| 5,600,501 A | * | 2/1997 | Yamakoshi et al. ............ 360/51 |
| 6,078,460 A | * | 6/2000 | Moriya ..................... 360/77.04 |
| 6,724,553 B1 | * | 4/2004 | Yun et al. ...................... 360/51 |
| 6,751,037 B1 | * | 6/2004 | Haines et al. .................. 360/51 |
| 6,781,786 B1 | * | 8/2004 | Ishii ........................ 360/78.04 |

FOREIGN PATENT DOCUMENTS

| | | |
|---|---|---|
| JP | 06-176486 | 6/1994 |
| JP | 09-115124 | 5/1997 |

* cited by examiner

*Primary Examiner*—Andrea Wellington
*Assistant Examiner*—Varsha A. Kapadia
(74) *Attorney, Agent, or Firm*—Townsend and Townsend and Crew LLP

(57) ABSTRACT

Head-to-head variations in the head gap distance between write and read heads is compensated by measuring the head gap distance in each head by writing and reading a predetermined unique pattern, and compensating the timing to start the data writing by changing it in a head-to-head manner based on a time gap that corresponds to the measured head gap distance in each head. This allows data to be written at a desired physical position regardless of the variation of the head gap distance, thereby allowing formatting efficiency to be improved.

9 Claims, 6 Drawing Sheets

(1)

Head A having nominal gap distance (2)

Head B having large gap distance (3)

Head C having small gap distance (1)

(2)

Head having large gap distance (3)

Head having small gap distance

METHOD FOR COMPENSATING TIMING TO START DATA RECORDING AND MAGNETIC DISK DEVICE USING SAME

CROSS-REFERENCE TO RELATED APPLICATIONS

This application claims priority to Japanese Application No. 2003-085870, filed Mar. 26, 2003, the entire disclosure of which is incorporated by reference for all purposes.

BACKGROUND OF THE INVENTION

The present invention relates generally to magnetic disk devices having separate heads for writing (recording) and reading (reproducing) data, and more specifically to compensating timing for starting writing to account for different distances between the heads.

FIG. 4 is a diagram showing how the data is typically written and read in a conventional magnetic disk device 1 in which data sectors (minimum addressable units for writing and reading) are arcs formed at specified positions on concentric circles (tracks). Servo signals 11 are written on the magnetic disk 1 in advance and are spaced uniformly in the rotation direction and include information in the radial direction. When the data is written and read in a specified data sector 12, a magnetic head 2 is first positioned with respect to the radial direction of the magnetic disk 1 by moving a rotation system support arm (not shown), to which the magnetic head 2 is attached, based on the information of the servo signals 11.

Next, a commanded position in the rotation direction on the disk is determined with reference to any signal identifying a specific physical position on the disk such as, for example, the end of the servo signals 11. Clocks and the like provide timing signals that are used to establish the waiting time T until the magnetic disk 1 is rotated so that a magnetic head 3 is positioned at the top of one of the data sectors. Typically, there are several data sectors between the servo signals 11. When the magnetic disk has rotated the correct distance, a write gate or a read gate is asserted.

When the write gate is asserted, a write current flows through the magnetic head 3 so that a signal is converted by the magnetic head 3 into magnetic information and written on the magnetic disk 1. On the other hand, when the read gate is asserted, the magnetic information on the magnetic disk 1 is converted into electric information by the magnetic head 3 and, then, the data is sent to a host through circuits such as an amplifier.

As described above, physical positions on the magnetic disk must be determined in order to assert the write gate and the read gate and, then, the signals to determine the physical positions on the magnetic disk should be determined based on the servo signals read from the read head. FIG. 5 shows a deviation in timing between the write head and the read head in the prior art wherein, in a magnetic disk device in which the write head and the read head are provided separately and the data is written and read by both heads as shown in FIG. 5, in the case where the write head 2b is apart from the read head 2a by a distance L in the backward direction, when a duration equivalent to the waiting time T has elapsed from the reference position defined by the servo signal 11, the read head 2a is placed at the top of the data sector 12 but the write head 2b is placed not at the top of the data sector 12 but at the preceding sector. Therefore, if the write gate is asserted to start writing at this timing, the data on the preceding sector would be overwritten. Further, if the data is written on the data sector disposed just after the servo signal, the servo signal may also be overwritten.

When the data is written using such magnetic heads, the write gate must be asserted to write the data after the magnetic disk has rotated a sufficient amount so that the write head is positioned at the top of the desired data sector as the magnetic disk rotates. This time gap TG depends on a head gap distance L of the write head and the read head as well as a relative speed v between the magnetic disk and the magnetic heads. Therefore, in a magnetic disk device in which the magnetic disk rotates with a uniform speed, as the relative speed v between the magnetic disk and the magnetic heads varies according to the radial position on the magnetic disk, the time gap TG must be compensated according to the radial position and a measure against the variation of the relative speed according to the radial position has been proposed (see Japanese Patent Laid-open Hei 6-176486).

Further, as the prior art, a concept in that values of the time gap TG resulted from the head gap distances L that vary from one head to another are measured to compensate the time gap TG for each head has been proposed (see Japanese Patent Laid-open Hei 09-115124).

In this connection, generally speaking, in the magnetic disk devices, as the head gap distance L is a value unique to each head and may vary in some extent due to manufacturing reasons, the time gap TG to be compensated may vary from one head to another. Further, based on the fact that it is difficult to measure the head gap distance L for each head, as the head gap distance L is replaced by a representative value and only the variation due to the relative speed v between the magnetic disk and the magnetic heads is compensated, the head-to-head variation of the time gap TG is accommodated by providing redundancy in the format of the data sectors as shown in (1) of FIG. 6 (or, more specifically, by adding areas A, B and C as shown in the figure, which will be described in detail later). Here, it is to be noted that FIG. 6 is a diagram for describing the format when the variation of the gap between the write head and the read head is not compensated.

Typically, the format of the data sectors includes minimal required areas consisting of: a Preamble area for compensating deviations in frequency and phase between writing and reading; a Sync area for indicating the top of the data; and a Data area including information to be written. However, the format shown in FIG. 6 further includes the extra areas A, B, and C for accommodating the variation of the time gap TG.

The areas A and B are needed so as to prevent forward and backward sectors from being overwritten due to the variation of the time gap TG. As described above, the write gate must be asserted when the write head 2b is positioned at the top of the data sector 12. However, as the physical positions on the magnetic disk can be determined by the servo signals read through the read head 2a, the positional relationship between the read head 2a and the magnetic disk can be known accurately but the determination of the position of the write head 2b should inevitably depend on the setting of the time gap TG.

Therefore, if the write operation is performed with a uniform time gap TG without compensating the head-to-head variation, the write gate will be asserted with uniform timing regardless of the head gap distance. At this time, if the data is written on the data sector 12 having an identical address by the head having a head gap distance L larger than the design value, the data may be written at a physical position that is offset forward from the position where the data ought to be written as shown in (2) of FIG. 6 and, therefore, the data on the receding sector may be overwritten. The area A is necessary to prevent this problem or, in other words, an area where the data is not written must be provided in the forward of the data sector so as to compensate the forward offset of the write position due to the variation of the head gap distance.

Similarly, if the data is written by the head having a head gap distance L smaller than the design value, as the data may be written at a physical position that is offset backward from the position where the data ought to be written as shown in (3) of FIG. 6, in order not to overwrite the data on the subsequent sector, the area B where the data is not written must be provided in the backward of the data so as to compensate the backward offset of the write position due to the variation of the head gap distance.

On the other hand, the area C is needed when the data is read. Typically, the read operation is started by asserting the read gate wherein, first, the deviations in frequency and phase from the data as written are corrected by a PLL circuit. This correction is performed in the Preamble area and, generally speaking, a constant periodic pattern, which is ready to be corrected, is written on the Preamble area. Then, the Sync pattern that indicates the top of the data is searched and, if the Sync pattern is found, the data after the Sync pattern is transferred to the host.

It is possible to know the physical position of the read head 2a on the magnetic disk and, therefore, the read gate can be asserted accurately at the top of the data sector 12 but, as the physical position where the data is written may be offset forward or backward due to the variation of the head gap distance in the write operation as described above, the signal may be read from the data with different timings depending on the variation of the head gap distance. At this time, if the Preamble area, which is necessary to correct the deviations in phase and the like of the timing to assert the read gate by the PLL circuit, cannot be obtained, the deviations in phase cannot be corrected sufficiently and the subsequent Sync area and the data cannot be read accurately and, therefore, the timing to assert the read gate will be synchronized with the head having the largest head gap distance by which the data is written at the most forward position.

However, when the read gate is asserted with such timing, if the head has a smaller head gap distance, the written data is offset backward and, therefore, no signal state will continue for a certain time period after the read gate is asserted. In the situation where the deviations in phase and the like is corrected by the PLL circuit after the read gate is asserted, the operation of the PLL circuit may be unstable and the subsequent correction may be impossible if the no signal state continues while the PLL circuit is operated and, therefore, the signal identical to the one written in the Preamble area must be written over the entire area C.

As there are these redundant areas in the format shown in FIG. 6, a portion that can be used effectively as the data area is reduced or, in other words, the formatting efficiency is reduced and, therefore, the write density must be increased in order to achieve the theoretical data storage capacity of the entire magnetic disk device.

In Japanese Patent Laid-open Hei 6-176486 described above, though the time gap TG corresponding to the head gap distance L between the write head and the read head is compensated according to the radial position on the magnetic disk, it is not contemplated to compensate the head-to-head difference of the head gap distance L.

On the other hand, in Japanese Patent Laid-open Hei 09-115124 described above, a concept in that the head-to-head difference of the head gap distance L is compensated so as to eliminate the redundant areas (the areas A, B and C) described above and increase the formatting efficiency is proposed at least, wherein the time gap TG is measured by employing an unwritable area (a splice) created due to the delay after the write gate is asserted until the write amplifier outputs the write current. However, in this measuring method, the splice may greatly depend on characteristics of the write amplifier and the length and other properties of the splice may vary according to circumstances, it is very difficult to detect the position of the splice.

SUMMARY OF THE INVENTION

The present invention provides techniques, especially applicable in disk devices having separate write and read heads, that compensate for variations in the head gap distance between the write head and read head. This can provide increased utilization of the potentially writeable area of the disk, i.e., improve formatting efficiency.

In short, this is accomplished by writing a predetermined pattern, reading the pattern, and using a timing relationship between the time of writing the pattern and the time of reading the pattern to determine the head gap distance. Thereafter, this knowledge is used to set the proper timing of the write gate.

In one aspect, the present invention provides a magnetic disk device that has an improved formatting efficiency and that can store a large amount of data by measuring a variation of a time gap TG resulting from a variation of a head gap distance between a write head and a read head accurately and compensating the timing of a write gate when data is written on a magnetic disk in a head-to-head manner so as to write the data at a desired physical position regardless of the variation of the head gap distance. In specific embodiments, the method acquires a time gap for compensating timing to start writing and reading for each track number, and compensates the timing to start the data writing by changing it for each track number based on the time gap for each track number.

In another aspect, the invention provides a method for compensating timing to start data writing in a magnetic disk device having one or more magnetic heads, each magnetic head having a write head and a read head with a head gap distance therebetween, the method comprising measuring the head gap distance in each of the one or more magnetic heads by writing and reading a predetermined unique pattern, and compensating the timing to start the data writing by changing the timing based on a time gap that corresponds to the measured head gap distance in each of the one or more magnetic heads.

In another aspect, the invention provides a method of establishing timing of write operations where the method is used with a magnetic disk device having a rotatable magnetic disk and a magnetic head, the magnetic head having separate write and read heads with a head gap distance therebetween. According to this aspect, the method comprises at a known first time interval after the read head detects a reference pattern on the magnetic disk, using the write head to write an identifiable predetermined pattern on the magnetic disk, using the read head to detect the reference pattern and the predetermined pattern, determining a second time interval between detecting the reference pattern and detecting the predetermined pattern, determining information relating to the head gap difference based at least in part on the first and second time intervals, and storing the information relating to the head gap difference for use in establishing the timing of subsequent write operations.

In some embodiments, the reference pattern is servo information on the magnetic disk. In other embodiments, the predetermined pattern is a Sync pattern indicating the top of the data. In other embodiments, determining the second time interval comprises establishing a read window having a duration substantially equal to the duration of the predetermined pattern reading the magnetic disk during the window interval while preventing reading during time intervals before and after the window interval and determining whether the predetermined pattern is within the window. If the predetermined pattern is not within the window, the window is moved, and the reading and determining are repeated until the predetermined pattern is found in the window, and the window position at which the predetermined pattern is found in the window is used to determine the second time interval.

In another aspect, the invention provides circuitry for use with a magnetic disk device having a magnetic head with a write head and a read head, where the magnetic head is characterized by a head gap distance between the write head and the read head. The circuitry comprises measurement circuitry that measures the head gap distance by writing and reading a predetermined unique pattern with the magnetic head, a memory that stores a time gap that corresponds to the head gap distance measured by said measuring means, and head gap compensation circuitry that compensates timing to start writing based on said time gap that is read out from said memory.

In some embodiments, the unique pattern is a Sync pattern indicating the top of the data. In some embodiments, the head gap compensation circuitry further compensates the timing to start the writing for each track number. In some embodiments, the disk device has a plurality of magnetic heads, each characterized by a respective head gap distance, thereby defining a plurality of head gap distances, the measurement circuitry measures the head gap distance for each of the plurality of magnetic heads by writing and reading respective predetermined unique patterns with the plurality of magnetic heads, the memory stores a plurality of time gaps that corresponds to the plurality of head gap distances measured by the measurement circuitry, and the head gap compensation circuitry compensates timing to start writing for each magnetic head based on the time gap for that head that is read out from the memory.

In another aspect, the invention provides a magnetic disk device comprising a magnetic disk, a write head for writing data on the magnetic, a write circuit for modulating the data and supplying a write current to the write head, a read head for reading the data from the magnetic disk, a read circuit for amplifying and demodulating a read signal provided by the read head, a gate generating circuit for generating a read gate and a write gate that determine timing to write and read the data, a pattern generating circuit for generating a pattern that is used for measuring a head gap distance, a gap measuring circuit for measuring the head gap distance based on a signal acquired by writing and reading the pattern, a memory for storing a time gap TG corresponding to the head gap distance, so measured, and a gap compensating circuit, coupled to the memory, for compensating the timing of writing data based on the time gap TG stored in the memory.

Therefore, at least some embodiments of the present invention, by adjusting the timing to start writing data on a head-by-head basis, are able to compensate the time gap TG resulting from the head gap distance between the write head and the read head on a head-by-head basis. This can be exploited to allow the data to be written at desired physical positions regardless of the variations of the head gap distance and, therefore, improve the formatting efficiency.

A further understanding of the nature and advantages of the present invention may be realized by reference to the remaining portions of the specification and the drawings.

DESCRIPTION OF SPECIFIC EMBODIMENTS

Figure 1:
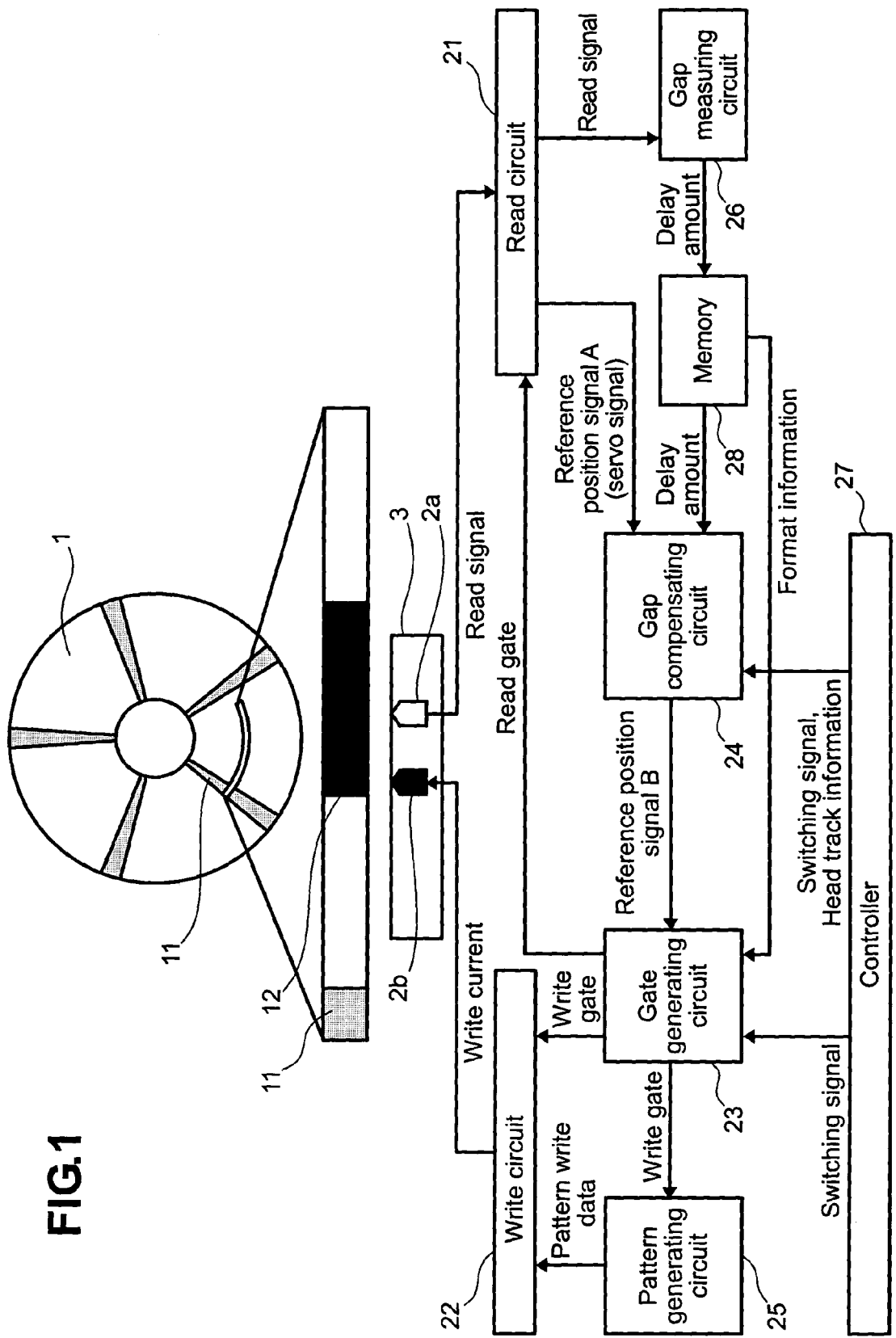
FIG. 1 is a diagram for describing an overall configuration and features of a magnetic disk device according to an embodiment of the present invention.
Figure 2:
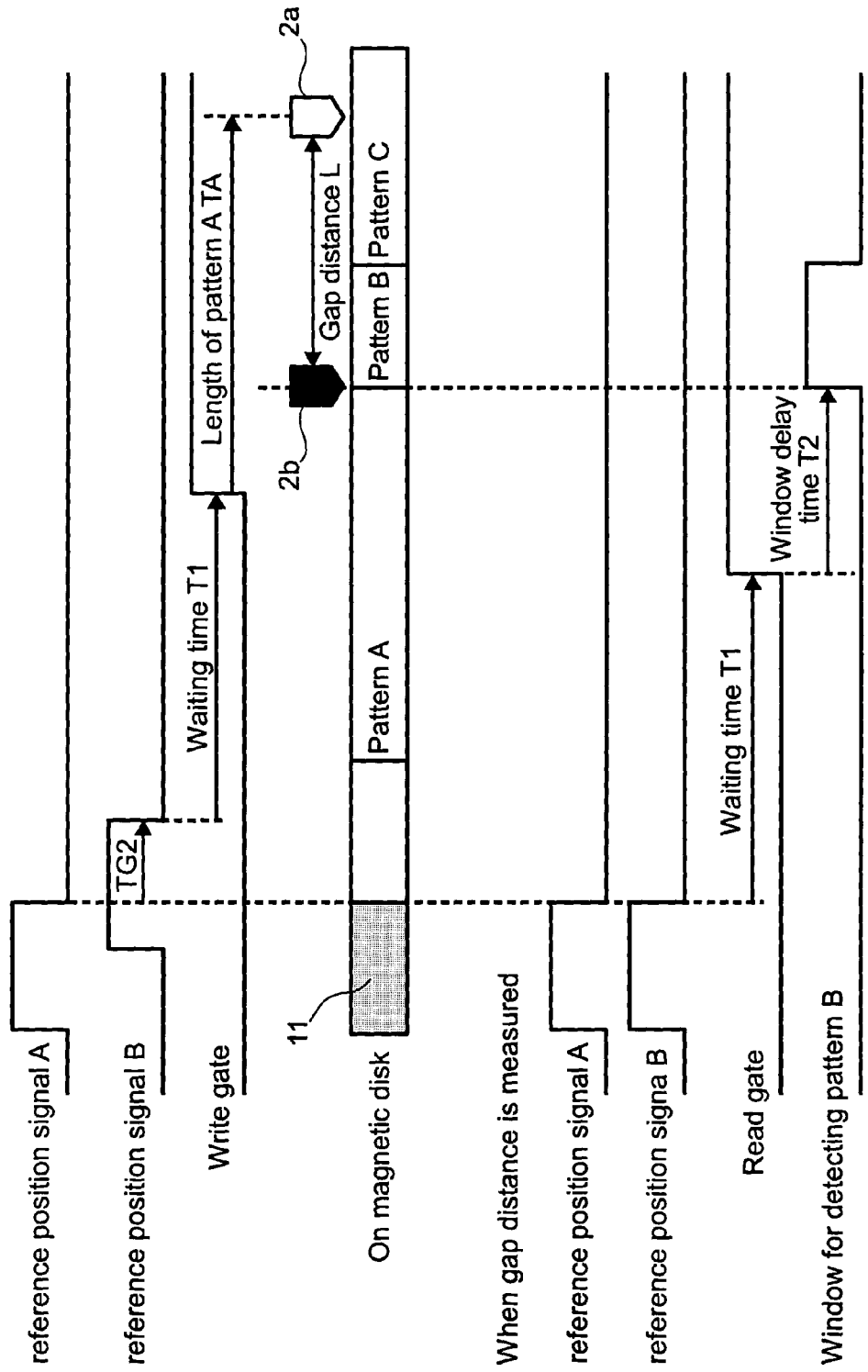
FIG. 2 is a diagram for describing features for compensating deviations in timing between a write head and a read head according to this embodiment.
Figure 3:
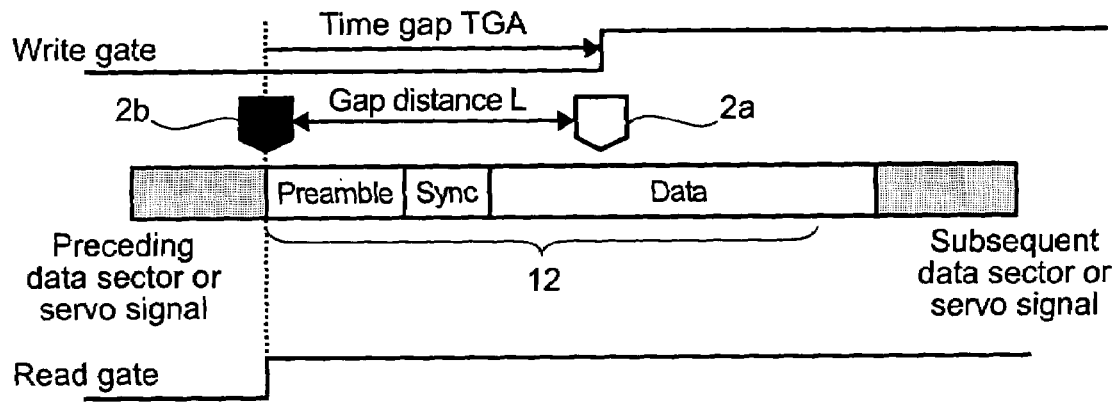
FIG. 3 is a diagram showing aspects of the timing to start the writing when the head gap distance between the write head and the read head is either nominal, large or small according to this embodiment.
Figure 3:
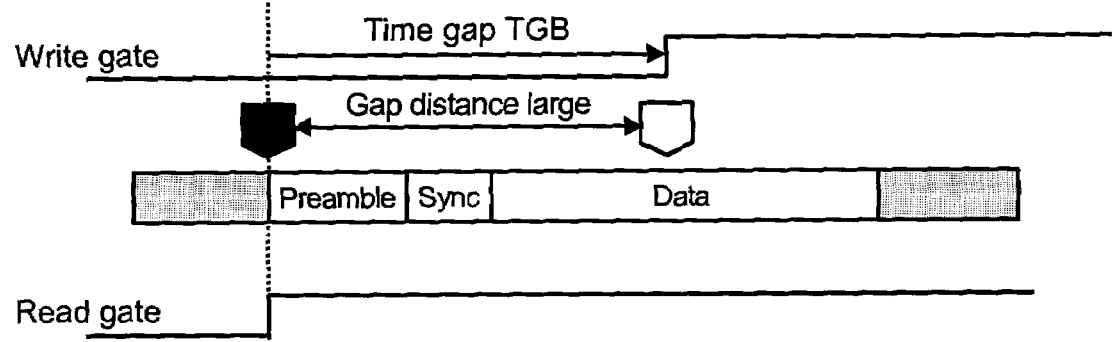
Figure 3:
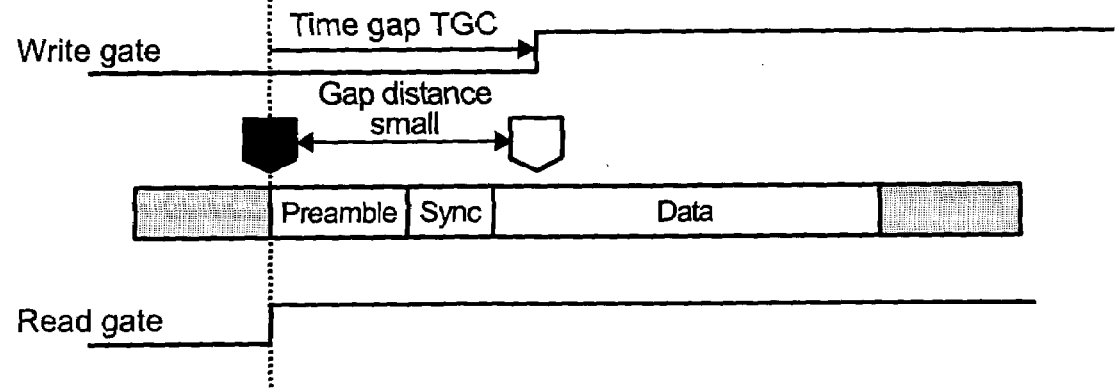
Figure 4:
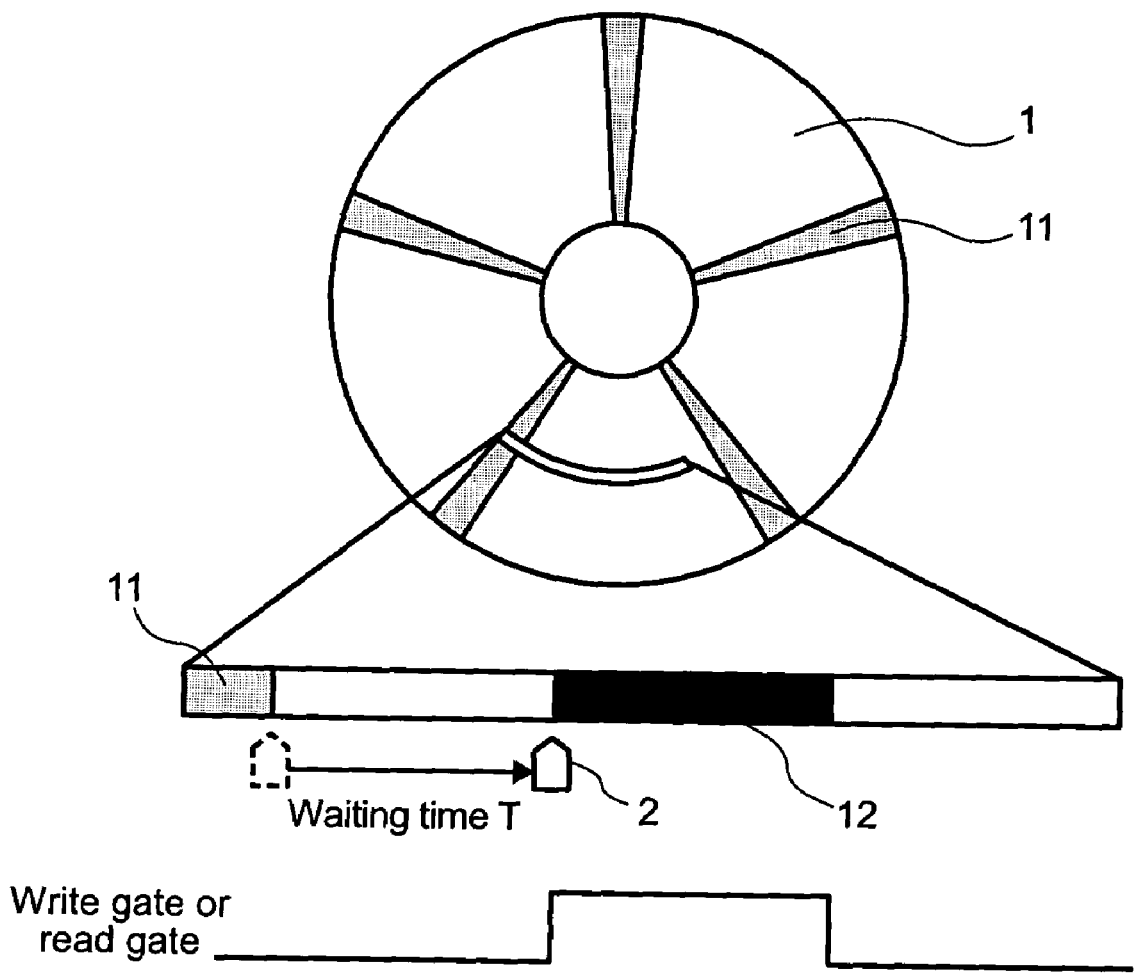
FIG. 4 is a diagram showing how the data is written and read typically in a conventional magnetic disk device.
Figure 5:
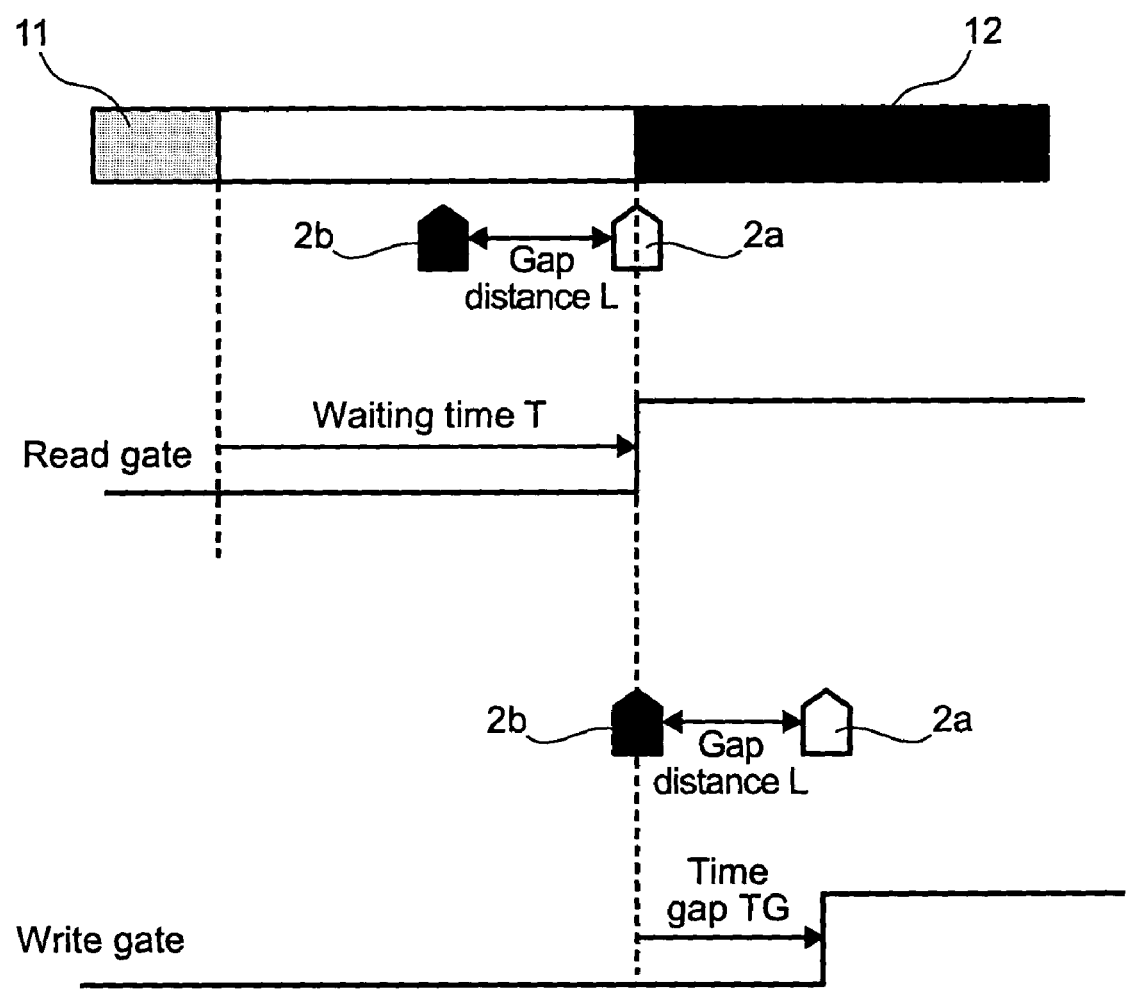
FIG. 5 is a diagram for describing a deviation in timing between the write head and the read head in the prior art.

Hereinafter, a method for compensating timing to start data writing and a magnetic disk device using the same according to an embodiment of the present invention will be described in detail with reference to FIGS. 1, 2, and 3. FIG. 1 is a diagram for describing an overall configuration and features of the magnetic disk device according to the embodiment of the present invention, FIG. 2 is a diagram for describing features for compensating deviations in timing between a write head and a read head according to this embodiment, and FIG. 3 is a diagram showing aspects of the timing to start the writing when the head gap distance between the write head and the read head is either nominal, large, or small according to this embodiment.

In FIG. 1, the magnetic disk device according to the embodiment of the present invention comprises a write head 2b for writing data on a magnetic disk 1, a write circuit 22 for modulating the data and supplying a write current to the write head 2b, a read head 2a for reading the data from the magnetic disk 1, a read circuit 21 for amplifying and demodulating a read signal provided by the read head 2a, a gate generating circuit 23 for generating a read gate and a write gate that determine timing to write and read the data, a gap compensating circuit 24 for compensating a time gap TG between the writing and the reading resulting from a head gap distance, a pattern generating circuit 25 for generating a write pattern that is used for measuring the head gap distance, a gap measuring circuit 26 for measuring the head gap distance based on a signal acquired by reading the write pattern, a controller 27 for controlling commands for writing and reading sent from a host, and a memory 28 for storing the time gap TG resulted from the head gap distance and other information.

As the magnetic disk 1 is attached to a spindle motor (not shown) to be rotated, data sectors 12 that are minimum units for writing and reading the data are disposed as concentric circles. The read head 2a and the write head 2b, which are apart from each other by a distance L in the rotation direction of the magnetic disk 1, are attached to a slider 3 so as to be moved to a target radial position (hereinafter referred to as the "track") on the magnetic disk 1 by a rotation system support arm (not shown). Servo signals 11 are written at regular intervals for positioning the heads in the radial direction and the data sectors 12 are disposed as the minimum units for writing and reading, for example, at the number of 3 to 5 between two servo signals.

The gate generating circuit 23 generates the gates (the write gate and the read gate) that are necessary for writing and reading. It receives a signal for switching between writing and reading from the controller 27 so as to send the read gate to the write circuit 22 at the time of writing and to send the read gate to the read circuit 21 at the time of reading. The servo signals 11 are used as necessary information for asserting the gates at accurate positions with respect to the rotation direction of the magnetic disk 1. The servo signals 11, which are written on the magnetic disk 1 in advance by a servo writer and the like, can be used to determine physical positions on the magnetic disk 1. Further, with reference to the immediately preceding servo signal 11, a time period during which the read head 2a or the write head 2b position relative to the rotating disk has moved from the reference position to the top of the data sector on the magnetic disk 1 is stored in the memory 28 as sector positional information (hereinafter referred to the "formatting information") (the time period during which the write head's relative position is moved will be described later).

In an actual write or read operation, the servo signal 11 is read by the read head 2a and sent to the read circuit 21. As the servo signal 11 includes an address mark signal that indicates a start position of the servo information, the read circuit 21 searches the address mark signal and demodulates the servo signal 11. At this time, the timing when the servo signal 11 ends is determined based on the timing when the address mark signal is detected and, then, a signal to indicate the end timing is sent to the gate generating circuit 23 as a reference signal to indicate an area of the servo signal 11. The gate generating circuit 23 reads from the memory 28 the time period during which the position of the read head 2a or the write head 2b relative to the rotating disk is moved from the immediately preceding servo signal 11 to the top position of the data sector, which has been acquired as the formatting information, and, then, counts the time, which is read from the reference position signal sent from the read circuit 21, by using clocks to assert the gate.

At this time, if the write head 2b is delayed relative to the read head 2a as shown in FIG. 1, the time period during which the position of the read head 2a relative to the rotating disk is moved from the immediately preceding servo signal 11 (for example, the reference position signal described above) to the top of the data sector differs from the time period during which relative position of the write head 2b is moved. Therefore, the timing to assert the write gate must be delayed relative to the timing to assert the read gate by the time gap TG that corresponds to the head gap distance. The time gap TG due to the head gap distance can be compensated by the gate generating circuit 23 only by keeping in the memory 28 both one formatting information for writing that allows for the time gap TG corresponding to the head gap distance and another formatting information for reading that does not allow for the time gap TG, though this embodiment is characterized in that the dedicated gap compensating circuit 24 is provided.

The gap compensating circuit 24 receives a reference position signal A indicating an area of the servo signal 11 generated by the read circuit 21 and, only at the time of writing, delays the reference position signal A by the time gap TG corresponding to the head gap distance and sends it to the gate generating circuit 23. As a consequence, a reference position signal B that is received by the gate generating circuit 23 at the time of writing appears as a signal indicating a positional relationship between the write head 2b and the magnetic disk 1 and, therefore, the gate generating circuit 23 can operate the write gate with a timing similar to the case of the read gate. Further, as the time gap TG resulted from the head gap distance differs from one head or track to another, the gap compensating circuit 24 is configured to receive information such as a switching signal to identify whether the operation in question is a write or a read operation, a head number, a track number and the like from the controller 27. Here, the reference position signal B, which is output from the gap compensating circuit 24, is an output signal that is delayed by the time gap TG corresponding to the head gap distance at the time of writing but it is another output signal without allowing for the time gap TG at the time of reading and these output signals are switched by the switching signal from the controller 27.

By storing the values of the time gap TG for each head or each track in the memory 28 and reading the corresponding value of the time gap TG from the memory 28 based on the information about the head number or the track number acquired from the controller 27, the head-to-head or track-to-track compensation can be implemented. However, a very large-capacity memory is needed for storing the values of the time gap TG that vary from one head or track to another, in the magnetic disk device that is rotated at a constant rotational speed, the time gap TG required at a track position R can be obtained from the time gap TG1 at a representative track position R1 by using the Equation 1 shown below and, therefore, it is sufficient to store only the representative time gap values for each head in the memory 28.

$$TG = TG1 \times R1/R \qquad \text{(Equation 1)}$$

Next, a method for measuring the time gap TG that varies from one head to another by using the pattern generating circuit 25 and the gap measuring circuit 26 will be described with reference to FIG. 2. First, a data pattern for measuring the time gap TG is written at an appropriate track position. The data pattern is written in a manner similar to the writing of the data sector as described above. At this time, the time period until the gate generating circuit 23 performs the gate operation based on the reference position signal read from the memory 28 is defined as T1 and the time gap TG read by the gap compensating circuit 24 from the memory 28 is defined as TG2. This TG2 must be a sufficiently large value so as not to overwrite the servo information 11 when the data pattern is written. The write gate is generated by the gate generating circuit 23 and sent to the write circuit 22 and the pattern generating circuit 25 and, then, when the write gate is asserted, the data pattern is sent from the pattern generating circuit 25 to the write circuit 22 and, then, the data is written on the magnetic disk 1 through the write head 2b.

The pattern generating circuit 25 generates the pattern for measuring the head gap distance. As shown in FIG. 2, the generated pattern includes a unique pattern B that appears only once in the overall pattern for detecting the deviation in time between the writing and the reading and, further, the patterns A and C before and after the pattern B do not include a pattern identical to the pattern B. The patterns A and C are not always needed but, as a Preamble pattern is typically needed for compensating the deviations in frequency and phase generated between the writing and reading so that the written pattern can be read accurately, it is desirable that the pattern A is the Preamble pattern. Further, if the pattern C is not written, the pattern read at this area becomes indefinite at the time of reading and there is a possibility to falsely detect the pattern B and, therefore, it is desirable to write a pattern that is different from the pattern B.

In the overall pattern shown in FIG. 2, the Preamble area, the Sync area, and the Data area in the typical pattern used for data writing can be considered as the patterns A, B, and C, respectively, the pattern generating circuit 25 may not be provided separately and may be substituted by a typical data pattern generating circuit.

Figure 6:
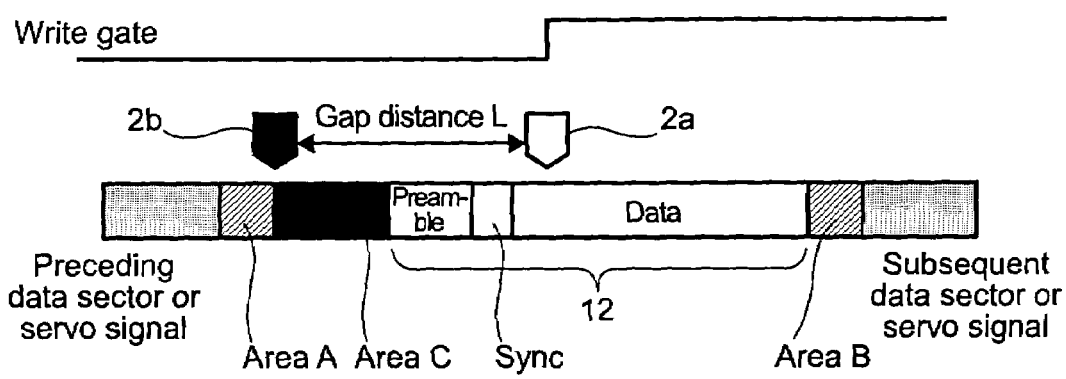
FIG. 6 is a diagram for describing the format when the variation of the gap between the write head and the read head is not compensated.
Figure 6:
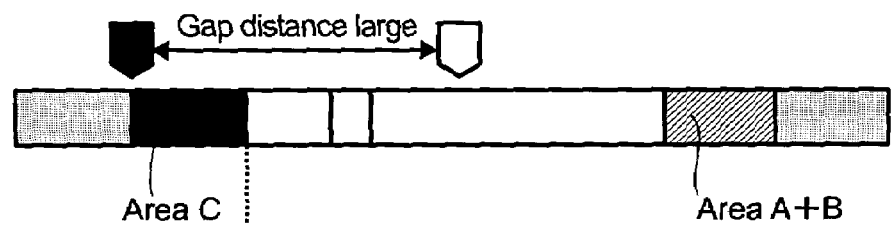
Figure 6:
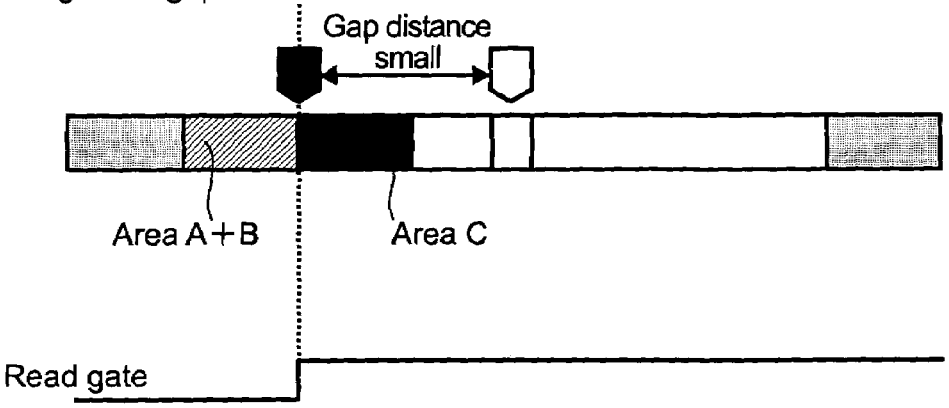

As described above, with reference to FIG. 2, in the data pattern for measuring the time gap TG1 resulted from the head gap distance L, the patterns A, B and C are written, for example, from the point of time that is further delayed from the reference position signal B, which is delayed by the time gap TG2 corresponding to a standard length L of the head gap distance, by the time period T1 until the magnetic head reaches the top of the data sector. Here, the pattern B is a unique pattern that can be distinguished from other patterns and it may be substituted by the Sync pattern shown in (1) of FIG. 6.

Next, the written data pattern is read. At this time, the reference position signal is not delayed in the gap compensating circuit 24 and, just as at the time of writing, the gate generating circuit 23 asserts the read gate to start reading when T1 has elapsed after the reference position signal B. At this time, the gap measuring circuit 26 measures the head gap distance from the waveform as read. The gap measuring circuit 26 checks whether there is the pattern B or not in the pattern as read. Here, the gap measuring circuit 26 has a window to limit the time period for performing this pattern check and it is determined that there is the pattern B in the pattern as read only when the pattern B is found within the window. When the width of the window is configured to be equal to the width of the pattern B, as shown in FIG. 2, the gap measuring circuit 26 can determine that there is the pattern B only when the position of the pattern B at the time of reading matches the position of the window. At this time, a time delay T2 up to the window after the read gate is asserted is measured.

In other words, with reference to FIG. 2, in the window for detecting the pattern B, for example, when the time period during which the window is turned on agrees with the time period of the pattern B, the timing to turn on the window or the window delay time T2 is adjusted appropriately and the gap measuring circuit detects whether the unique pattern B agrees with the pattern read within the window. The window delay time T2 when the reproduction output to make these patterns agree with each other is obtained is adopted as the proper window delay time T2. As a result, assuming that a time period TA is needed to write the pattern A, the time gap TG1 resulted from the head gap distance in the measuring track position can be calculated from the positional relationship shown in FIG. 2 by using the Equation 2 as follows.

$$TG1 = TG2 + T1 + TA(\text{the length of the pattern } A) - T1 - T2 \quad \text{(Equation 2)}$$

Here, (TG2+T1+TA) is a time period needed by the write head to write from the reference position signal A to the starting point of the pattern B, T1 is a time period needed at the time of reading from the reference position signal A to the top of the data sector (the reference position signals A and B shown in FIG. 1 have the same timing in the time of reading), and T2 is the measured time period that corresponds to the length TA of the pattern A. Further, (T1+T2) is a time period needed by the read head to read from the reference position signal A to the starting point of the pattern B.

Further, assuming that the head moving speed on the measuring track is v, the actual head gap distance L can be expressed by the Equation 3 as follows.

$$L = TG1 \times v \quad \text{(Equation 3)}$$

When the values of the time gap TG resulted from the head gap distance are stored in the memory 28 for each track, the values for all tracks may be measured individually or the time gap values for all tracks may be calculated according to the Equation 1 described above and stored in the memory 28 as needed.

A format of the written data when the time gap resulted from the head gap distance is compensated by the gap compensating circuit 24 based on the time gap TG1 measured by the method described above is shown in FIG. 3. The value of the time gap TG1 corresponding to the head gap distance, which is measured in a head A having the nominal head gap distance is defined as TGA. By storing this value in the memory 28, the gap compensating circuit 24 delays the reference position signal A by this time gap TGA only when the data is written. As a result, as shown in (1) of FIG. 3, the timing to assert the write gate is delayed from the timing to assert the read gate by the time gap TGA, the timing to assert the read gate coincides with the top of the data sector.

On the other hand, with reference to (2) of FIG. 3, when the head has a large head gap distance, as the signal shown in FIG. 2 is written on the magnetic disk with a forward offset, the time period T2 during which the pattern B is detected becomes shorter. As a result, the time gap TG1 corresponding to the measured head gap distance becomes longer than the time gap TGA mentioned above. Defining this time gap as TGB, even when the read gate is asserted at the same timing as the head A having the nominal head gap distance, as the time gap TGB until the write gate is asserted becomes longer, the top position of the read gate agrees with the one of the data. Also, the preceding data is not overwritten in this case.

Similarly, with reference to (3) of FIG. 3, when the head has a small head gap distance, as the signal shown in FIG. 2 is written on the magnetic disk with a backward offset, the time period T2 during which the pattern B is detected becomes longer. As a result, the time gap TG1 corresponding to the measured head gap distance becomes shorter than the time gap TGA mentioned above. Defining this time gap as TGC, even when the read gate is asserted at the same timing as the head A having the nominal head gap distance, as the time gap TGC until the write gate is asserted becomes shorter, the top position of the read gate agrees with the one of the data. Also, the subsequent data is not overwritten in this case.

Thus, by measuring the values of the time gap TG1 corresponding to the head gap distance for each head and compensating the timing to assert the write gate according to the measured time gap values as TGA, TGB or TGC, when the data sectors 12 having an identical physical address are written by each head, the data sectors will be disposed at the same position on the magnetic disk 1 regardless of the variation of the head gap distance of each head. As a result, the redundant areas A, B and C shown in FIG. 6 can be eliminated and, therefore, the formatting efficiency can be improved.

While the above is a complete description of specific embodiments of the invention, the above description should not be taken as limiting the scope of the invention as defined by the claims.

What is claimed is:

1. A method for compensating timing to start data writing in a magnetic disk device having one or more magnetic heads, each magnetic head having a write head and a read head with a head gap distance therebetween, the method comprising:
   writing a predetermined unique pattern generated by a dedicated pattern generating circuit onto an area on a magnetic disk other than a user data area by the one or more magnetic heads, wherein the user data area has a preamble area;
   measuring the head gap distance in each of the one or more magnetic heads by reading the predetermined unique pattern written onto the area; and
   compensating the timing to start the data writing onto the user data area by control of a dedicated gap compensating circuit, wherein the dedicated gap compensating circuit changes the timing based on a time gap that corresponds to said measured head gap distance in each of the one or more magnetic heads.

2. A method for compensating timing to start data writing in a magnetic disk device according to claim 1, wherein preamble data is written before the predetermined unique pattern, and data which is different from the predetermined unique pattern is written after the predetermined unique pattern.

3. In a magnetic disk device having a rotatable magnetic disk and a magnetic head, the magnetic head having separate write and read heads with a head gap distance therebetween, a method of establishing timing of write operations, the method comprising:
   at a known first time interval after the read head detects a reference pattern on the magnetic disk, using the write head to write an identifiable predetermined pattern generated by a dedicated pattern generating circuit onto an area other than a user data area of the magnetic disk, wherein the user data area has a preamble area;
   using the read head to detect the reference pattern and the predetermined pattern written onto the area;
   determining a second time interval between detecting the reference pattern and detecting the predetermined pattern;
   determining information relating to the head gap difference based at least in part on the first and second time intervals;
   storing said information relating to the head gap difference for use in establishing the timing of subsequent write operations; and
   compensating the timing to start the write operation onto the user data area by control of a dedicated gap compensating circuit, wherein the dedicated gap compensating circuit changes the timing based on the information relating to the head gap stored.

4. The method of claim 3 wherein said determining the second time interval comprises:
   establishing a read window having a duration substantially equal to the duration of the predetermined pattern;
   reading the magnetic disk during the window interval while preventing reading during time intervals before and after the window interval;
   determining whether the predetermined pattern is within the window; and
   if not, moving the window.
   repeating reading and determining until the predetermined pattern is found in the window, and
   using the window position at which the predetermined pattern is found in the window to determine the second time interval.

5. A method according to claim 3, wherein preamble data is written before the predetermined unique pattern, and data which is different from the predetermined unique pattern is written after the predetermined unique pattern.

6. A magnetic disk device having a magnetic head with a write head and a read head, the magnetic head being characterized by a head gap distance between the write head and the read head, the magnetic disk device comprising:
   means for writing a predetermined unique pattern onto an area on a magnetic disk other than a user data area by the one or more magnetic heads, wherein the user data area has a preamble area;
   measurement means for measuring the head gap distance by reading the predetermined unique pattern written onto the area with the magnetic head;
   memory means for storing a time gap that corresponds to the head gap distance measured by said measuring means; and
   head gap compensation means for compensating timing to start writing onto the user data area and changing the timing based on said time gap that is read out from said memory means.

7. A magnetic disk device according to claim 6, wherein preamble data is written before the predetermined unique pattern, and data which is different from the predetermined unique pattern is written after the predetermined unique pattern.

8. A magnetic disk device comprising:
   a magnetic disk;
   a write head for writing data on said magnetic disk;
   a write circuit configured to modulate the data and supply a write current to said write head;
   a read head for reading the data from said magnetic disk;
   a read circuit configured to amplify and demodulate a read signal provided by said read head;
   a gate generating circuit configured to generate a read gate and a write gate that determine timing to write and read the data;
   a pattern generating circuit configured to generate a unique pattern to be written onto an area on a magnetic disk other than a user data area by the write head, the unique pattern being used for measuring a head gap distance, wherein the user data area has a preamble area;
   a gap measuring circuit configured to measure said head gap distance based on a signal acquired by reading said unique pattern written onto the area;
   a memory for storing a time gap TG corresponding to said head gap distance, so measured; and
   a gap compensating circuit, coupled to said memory, being configured to compensate the timing of writing data onto the user data area, wherein the gap compensating circuit changes the timing based on said time gap TG stored in said memory.

9. A magnetic disk device according to claim 8, wherein preamble data is written before the predetermined unique pattern, and data which is different from the predetermined unique pattern is written after the predetermined unique pattern.

* * * * *